US 6,623,636 B2

(12) United States Patent
Rohrbach et al.

(10) Patent No.: US 6,623,636 B2
(45) Date of Patent: Sep. 23, 2003

(54) STAGED OIL FILTER INCORPORATING TIMED RELEASE OIL CONDITIONER

(75) Inventors: Ronald Paul Rohrbach, Flemington, NJ (US); Gordon William Jones, Wakefield, RI (US); Peter D. Unger, Morristown, NJ (US); Daniel E. Bause, Flanders, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/233,852

(22) Filed: Aug. 30, 2002

(65) Prior Publication Data

US 2002/0195384 A1 Dec. 26, 2002

Related U.S. Application Data

(63) Continuation-in-part of application No. 09/566,034, filed on May 8, 2000.

(51) Int. Cl.[7] .............................................. B01D 27/14
(52) U.S. Cl. ..................... 210/202; 210/206; 210/259; 210/266; 210/282; 210/287; 210/416.5
(58) Field of Search .................................. 210/206, 266, 210/282, 287, 416.5, DIG. 17, 202, 209, 259

(56) References Cited

U.S. PATENT DOCUMENTS 4,144,166 A * 3/1979 DeJovine .................... 508/117
5,725,031 A * 3/1998 Bilski et al. .................... 141/2

* cited by examiner

Primary Examiner—Ivars Cintins

(57) ABSTRACT

An oil-conditioning filter, for use with an internal combustion engine, includes a mechanically active filter element and a chemically active filter element. The chemically active filter element has a beneficial oil conditioning agent contained in a plurality of porous additive-dispensing modules. Each of the additive-dispensing modules includes a hollow housing having a plurality of holes formed therein, and a beneficial oil additive disposed within the housing. Optionally, each additive-dispensing module may also include a porous or semi-porous polymeric membrane covering the housing, to control the rate at which the additive material diffuses outwardly therefrom.

14 Claims, 6 Drawing Sheets

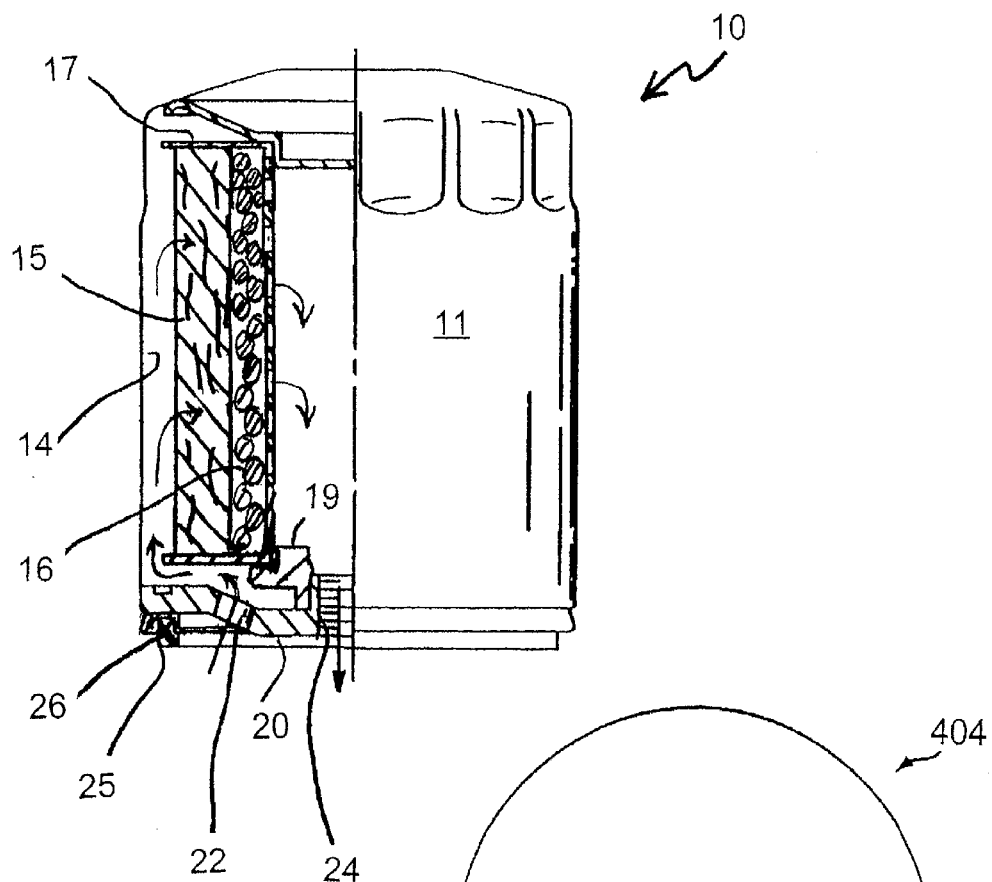
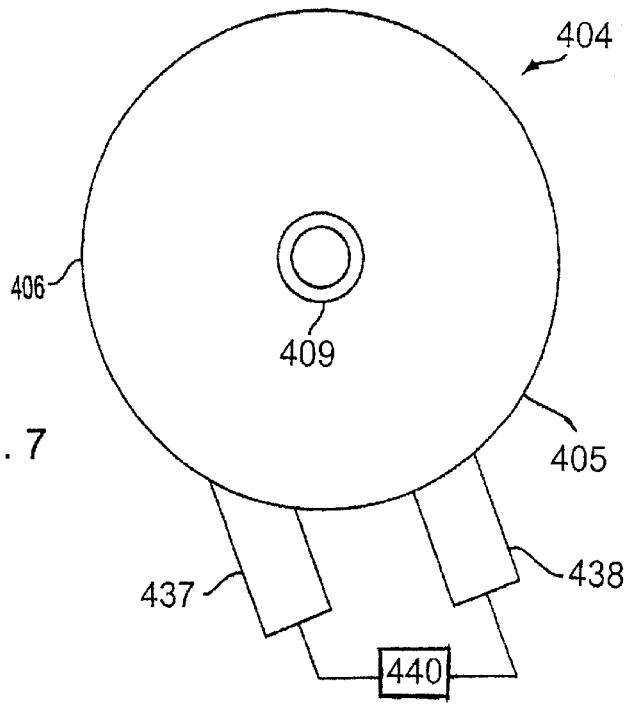

STAGED OIL FILTER INCORPORATING TIMED RELEASE OIL CONDITIONER

CROSS-REFERENCE TO RELATED APPLICATIONS

This is a continuation-in-part of application Ser. No. 09/566,034, filed May 8, 2000.

BACKGROUND OF THE INVENTION

1. Field of the Invention

The present invention relates to an oil filter assembly, for use in conjunction with an internal combustion engine. More particularly, the present invention relates to an oil filter assembly having both a mechanically active filter element and a chemically active filter element incorporated therein. Even more particularly, the present invention relates to an oil filter in which a chemically active filter element includes a plurality of porous additive-dispensing modules, each of the additive-dispensing modules containing one or more oil-conditioning compounds therein. The additive-dispensing modules slowly release one or more oil conditioning agents, over time, into engine oil.

2. Description of the Background Art

Many different types of fluid filters are known. Most such filters use a mechanical or 'screening' type of filtration, with a replaceable cartridge having a porous filter element therein, through which the oil is repeatedly cycled to remove impurities.

In the oil filtration art, it is well known that normal operation of an internal combustion engine, particularly a diesel engine, results in the formation of contaminants. These, contaminants include, among others, soot, which is formed from incomplete combustion of the fossil fuel, and acids that result from combustion. Both of these contaminants are typically introduced into the lubricating oil during engine operation, and tend to increase oil viscosity and generate unwanted engine deposits, leading to increased engine wear.

The conventional solution to these problems has been to place various additives into lubricating oils, during their initial formulation. In order to combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

In order to counteract the effects of acidic combustion products, many conventional motor oils include neutralizing additives known as over-based detergents. These are a source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. The inclusion of these further additives may be beneficial; however, with conventional methods, the amount and concentration of these additives are limited by the ability of lubricating oils to suspend these additives, as well as by the chemical stability of these additives in the oil.

Other solutions have been proposed in addition to the conventional method of mixing additives with lubricating oil. For example, in order to combat the buildup of sludge in oil, U.S. Pat. No. 5,042,617, issued in 1991 to Brownawell, and entitled Method of Reducing the Presence of Sludge in Lubricating Oils; and U.S. Pat. No. 5,478,463, issued in 1995 to Brownawell et al, and entitled Method of Reducing Sludge and Varnish Precursors in Lubricating Oil, each disclose an oil filter and method for reducing the amount of sludge in lubricating oil as it circulates through an engine. These Brownawell patents provide for the inclusion of particles in an oil filter that are oil insoluble and oil wettable, and which complex with sludge, such that at least some of the sludge that these particles come into contact with is immobilized on the particles. The Brownawell '617 patent discloses the inclusion of oil insoluble and oil wettable particles in an oil filter that are retained on a moduleized substrate, whereas the Brownawell '463 patent discloses the inclusion of such particles that are not retained on a substrate, but are nonetheless retained in the oil filter.

Another Brownawell patent, which relates to the reduction of combustion acids in lubricating oil, is U.S. Pat. No. 5,069,799 issued in 1991 and entitled Method For Rejuvenating Lubricating Oils. This patent discloses an oil filter and method for reducing the amount of combustion acids in lubricating oil. In particular, it discloses a method of rejuvenating lubricating oil, which includes reduction of combustion acids, by serially passing the oil through first a chemically active filter media, then a physically active filter media, and finally an inactive filter media. In this '799 patent, the chemically active filter media includes a strong base, to displace weak bases that have combined with combustion acids. The combustion acid and the strong base then combine to form a salt, which is then physically trapped by subsequent mechanical filter media.

U.S. Pat. No. 5,225,081 to Brownawell discloses method of removing polynuclear aromatics from used lubricating oil. The method of the Brownawell '081 reference involves passing oil through a staged oil filter system, which may include a chemically active filter media. The chemically active filter media is made of a composite material including particles of an active component and a thermoplastic binder, which are a product of a heated extrusion process. Basic conditioners are given as one example of materials suitable for use as chemically active filter media. Activated carbon is also emphasized as a preferred component of the filter media in this reference.

Some designs for multiple stage oil filters are known, such as those disclosed in U.S. Pat. Nos. 4,557,829 and 4,886,599. U.S. Pat. No. 4,886,599 to Bachmann et al. discloses a filter cartridge with sequential concentric cylindrical filter elements, for both chemical and mechanical filtration of oil contained in an oil-sealed vacuum pump.

Other designs for oil filters that contain extra additives and dispense those additives into oil, over time, are disclosed in U.S. Pat Nos. 5,552,040, and 5,591,330. Some designs are also known for heavy duty coolant filters which release additives over time, such as those disclosed in U.S. Pat. Nos. RE 37,369, 5,741,433, and 5,948,248.

While the known filters are usable for their intended purposes, the release of supplemental additives from the known filters often takes place either immediately after installation or more rapidly than is needed for protecting the oil. Subsequently, after some time has elapsed, there may be little or no additive left in the filter.

A need still exists in the art for an improved oil filter having a beneficial oil additive incorporated therein, which additive is slowly released over the useful life of the filter. A need also exists for an improved oil filter which could extend the useful life of engine oil, so as to allow a user to extend the time interval between oil changes in a vehicle, particularly a vehicle having a diesel engine.

SUMMARY OF THE INVENTION

The present invention provides an improved oil filter, having a basic conditioner and/or another beneficial additive incorporated therein. The basic conditioner, where used, is provided to counteract the effects of acidic combustion products in the oil. In the practice of the present invention, the beneficial additive is housed within a plurality of porous additive-dispensing modules within the oil filter housing.

In a preferred embodiment of the invention, each of the additive-dispensing modules includes a porous module housing which is a hollow ceramic or polymeric shell, and a beneficial additive contained within the housing. In a particular embodiment of the invention, the additive-dispensing modules have a porous or semi-porous polymeric membrane covering and surrounding the module housing, to control the rate of diffusion therethrough.

Accordingly, it is an object of the present invention to provide an improved oil filter including one or more beneficial oil additives that are released slowly over the life of the filter.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is a cross-sectional view of the filter of FIG. 1;

FIG. 7 is a simplified top plan view of a supplemental cartridge, which is a component of the assembly of FIG. 6.

DETAILED DESCRIPTION

Figure 1:
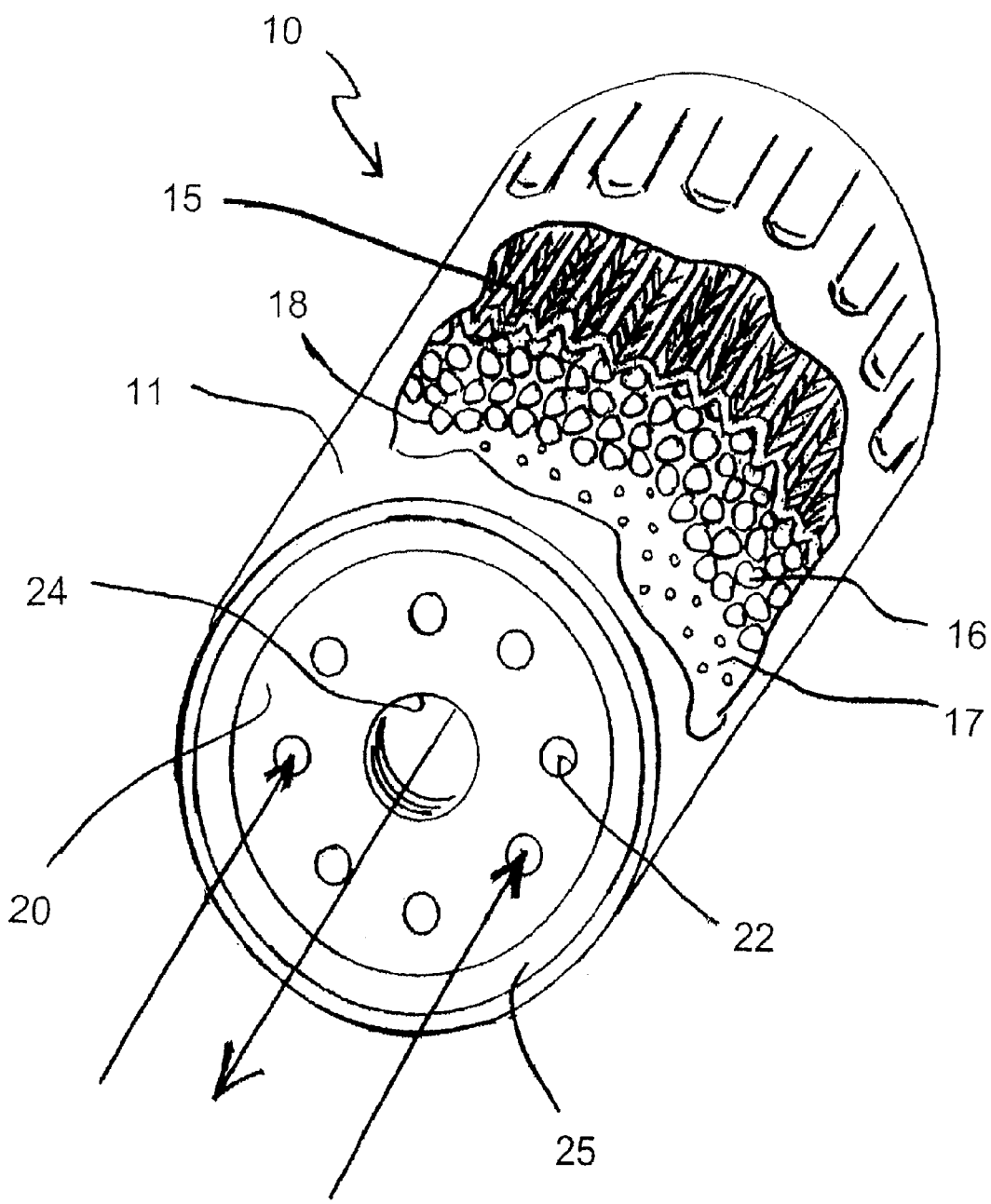
FIG. 1 is a perspective view, partially cut away, of an oil filter in accordance with a first embodiment of the present invention.

Throughout the present specification, relative positional terms like 'upper', 'lower', 'top', 'bottom', 'horizontal', 'vertical', and the like are used to refer to the orientation of the filters shown in the drawings. These terms are used in an illustrative sense to describe the depicted embodiments, and are not meant to be limitative. It will be understood that in a specific application thereof, a filter may be installed on an engine in an orientation different from that shown in the drawings, such as inverted 180 degrees or transverse to that shown, and in such a case, the above-identified relative positional terms will no longer be accurate.

Referring to FIGS. 1 and 2, there is shown an oil filter 10 according to a first preferred embodiment of this invention. The direction of oil flow, through the filter 10, is shown by the arrows in FIG. 2, which illustrate a flow path through the filter.

The oil filter 10 generally includes a hollow cylindrical housing 11 which defines a chamber 14 therein, a porous mechanically active filter element 15 within that chamber, and a chemically active filter element 16, made up of a plurality of individual composite additive-dispensing modules 18, also retained within the chamber inside the housing. A foraminous cylindrical screen or support frame 17 may, optionally, be provided within the housing 11 to supportively hold the filter elements 15, 16 therein.

A grommet 19 or other internal sealing member is provided centrally at the base of the frame 17 to route the oil along the flow path and through the filter elements 15, 16. The grommet 19 may include a flexibly resilient sealing member having an integral pressure relief valve therein, such as that disclosed in U.S. Pat. No. 6,214,215, the disclosure of which is incorporated by reference. Alternatively, the oil filter 10 may incorporate a spring-loaded or other conventional pressure relief valve of a type known to those in the art.

A base plate 20 of the housing 11 includes a plurality of inlet ports 22 formed therethrough and arranged in a circular pattern. The base plate 20 also includes a central outlet port 24. The outlet port 24 has a plurality of female threads formed therein to allow rotatable mounting of the filter 10 on an externally threaded hollow tubular fitting on an engine block (not shown). An annular external seal or gasket 25 fits engagingly into a groove 26 formed at the bottom surface of the base plate, to resist oil leakage outwardly from the base of the filter.

In the depicted embodiment 10 of FIGS. 1–2, the mechanically active filter element 15 is a conventional cylindrical member made of accordion-pleated filter paper.

Further in the embodiment of FIGS. 1–2, the chemically active filter element 16 is also provided in the general shape of a cylinder, and is disposed radially and coaxially within the mechanically active filter element 15. In this first embodiment 10, the chemically active filter element 16 is located inside of, and therefore downstream of the mechanical filter element 15, in order to allow a mechanical filtration to take place before the chemical reaction of unwanted contaminants from the oil with the beneficial additive composition of the chemical filter element 16. Placement of the chemical filter element 16 between the mechanically active filter element 15 and the frame member 17, as shown in the first filter embodiment 10, puts it downstream in the flow path from the mechanical filter element, yet still obtains the maximum possible support from the frame member 17. This may be helpful where the chemical filter element 16 is made up of a plurality of separate and unconnected individual modules 18.

Alternatively, the individual additive-dispensing modules 18 making up the chemically active filter element 16 may be bonded together or otherwise cohesively associated with one another to form a substantially integral, yet highly porous filter element 16 capable of independent self-support.

The additive-dispensing modules 18 making up the chemically active filter element 16 are an important feature of the filter 10 hereof.

Figure 3A:
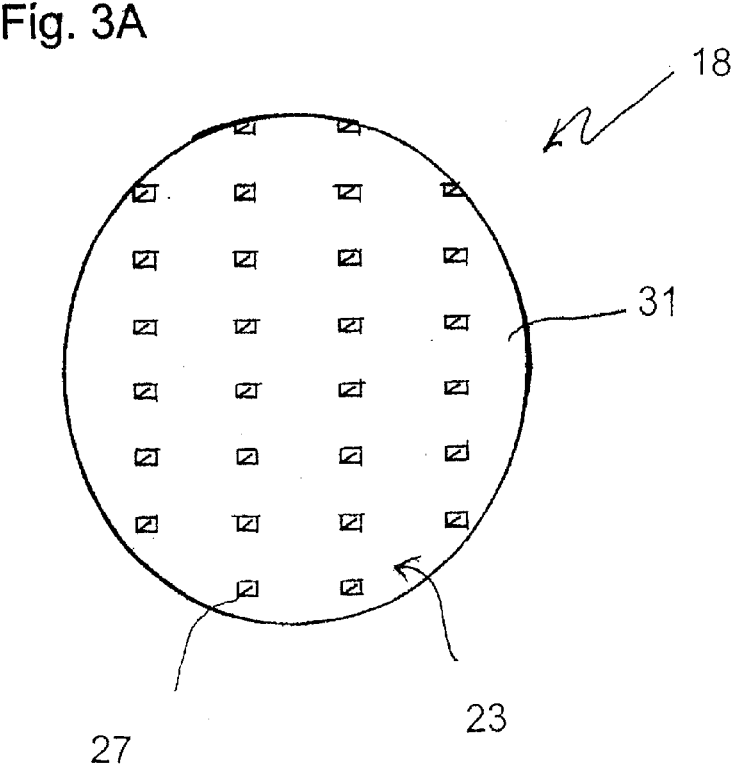
FIG. 3A is a side plan view of an additive dispensing module, which is a component of the oil filter of FIGS. 1–2.
Figure 3B:
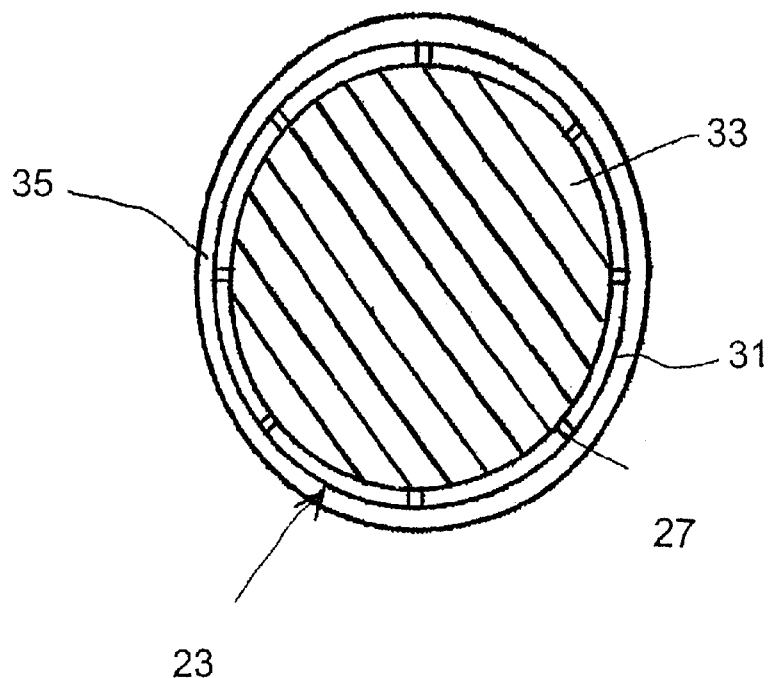
FIG. 3B is a cross-sectional view of the additive-dispensing module of FIG. 3A.

The additive-dispensing modules 18 are made of a combination of materials. Referring now to FIGS. 3A and 3B, a representative additive-dispensing module 18 is shown. The module 18 includes a module housing in the form of a hollow shell 23, which is preferably formed from a ceramic or polymeric material. The housing shell 23 includes a relatively thin wall 31 having a plurality of apertures 27 formed therethrough, to allow diffusion of a beneficial additive composition 33 outwardly therefrom.

Disposed within the interior of the housing shell 23 is a beneficial additive composition 33, which includes one or more additives which may be selected from the group including basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The additive composition 33 is preferably injected into the housing shell 23 in a hot liquid state, and solidifies as it cools. Alternatively, the additive composition 33 may be added in powder form, or may be dispersed in a grease or in a wax. The additive composition 33 is preferred to be at least partially soluble in hot engine oil.

Optionally, and as shown in FIG. 3B, the additive-dispensing module 18 may have a porous or semiporous membrane 35 covering and surrounding the housing shell 23. The membrane 35, where used, is preferred to be formed of a polymeric material, which may be selected from polysulfones, waxes, polymethylene pentene, or other suitable permeable or semi-permeable material. The material selected for the membrane 35 can be stable in a hot oil environment, or may be a material which will erode over time in a hot oil environment. The membrane 35 allows the beneficial additive composition 33 to be slowly released into the oil from the additive-dispensing module 18, thereby conditioning the oil in a metered manner over time.

The basic conditioner of the additive-dispensing modules, where used, is preferably a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

Other materials may be added to the additive-dispensing modules, if desired.

As previously noted, if desired, the additive-dispensing modules may be bonded together or otherwise connected together to form a substantially integral, yet perforated and highly porous chemical filter element 16. Where the additive-dispensing modules 18 are joined together in this way, the frame member 17 is not needed, and may be omitted if desired.

During use, as hot oil slowly flows past and around the additive-dispensing modules 18 in the chemically active filter element, some of the oil enters the apertures 27 of the module housings, causing a small amount of the beneficial additive 33 to pass outwardly from the module housing 23, and to mix with the oil. Where used, the basic salt component of the additive 33 acts to counteract and neutralize acidic combustion products. This neutralization of acidic combustion products allows for a much longer useful life of some other oil additives such as, for example, dispersants and zinc dialkyldithiophosphate (ZDP), which are provided in the oil by the manufacturer thereof. This, in turn, allows for greater intervals between oil changes than is possible without the chemically active filter element.

Figure 4:
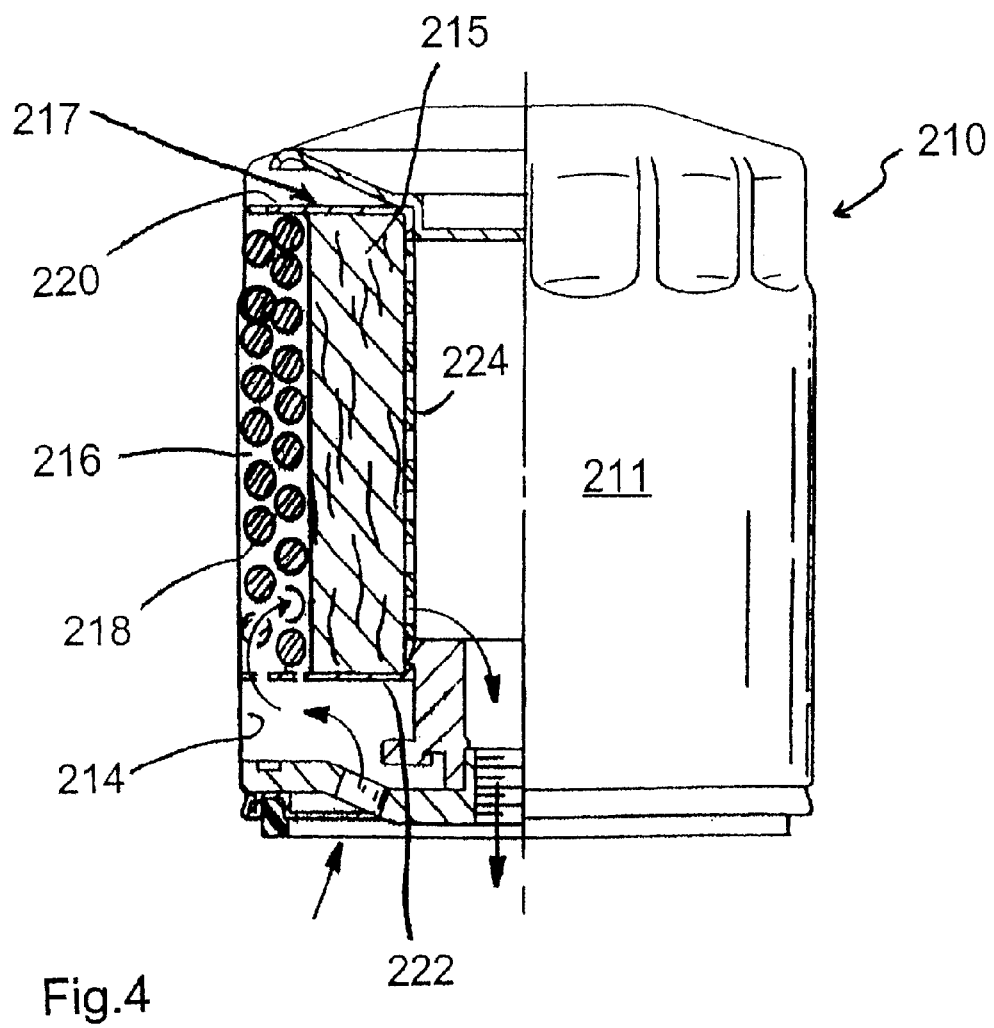
FIG. 4 is a cross-sectional view of an oil filter according to a second embodiment of the present invention.

Referring now to FIG. 4, a cross-section of an oil filter 210 in connection with a second embodiment is shown. The oil filter 210 in this embodiment generally includes a cylindrical housing 211 which defines a hollow space 214 therein, a porous mechanically active filter element 215 within that space, and a chemically active filter element 216, made up of a plurality of individual composite additive-dispensing modules 218, also retained within the hollow space inside the housing and disposed within the mechanically active filter element. The additive-dispensing modules 218 are substantially identical to the additive-dispensing modules 18, as described in connection with the first embodiment 10.

As noted in connection with the first embodiment 10, the individual additive-dispensing modules 218 making up the chemically active filter element 216 may be bonded together or otherwise cohesively associated with one another to form a substantially integral, yet highly porous filter element 216 capable of independently supporting itself. With the exception of the configuration and placement of the respective mechanical and chemical filter elements 215, 216 as specified in this section, the oil filter 210 is substantially identical to the oil filter 10 of the first embodiment, as described hereinabove.

In the embodiment 210 of FIG. 4, the mechanically active filter element 215 is a conventional cylindrical member made of accordion-pleated filter paper.

The chemically active filter element 216 is also provided in the shape of a cylinder in this embodiment, and is disposed radially and coaxially outside of the mechanically active filter element 215. A foraminous cylindrical screen or support frame 217 may, optionally, be provided within the housing 211 to supportively hold the filter elements 215, 216 therein. In this second embodiment 210 the chemically active filter element 216 is located outside of, and therefore upstream of the mechanical filter element 215, in order to allow chemical modification of acids or other unwanted contaminants which may be present in the oil, with the additive composition of the chemical filter element 216, prior to mechanical filtration.

In this second embodiment 210, the top and bottom horizontal segments 220, 222 of the frame member 217 have been extended outwardly towards the outer wall of the housing 211, as compared to the frame member 17 from the first embodiment, to contain the additive-dispensing modules 218 of the chemically active filter element therebetween. However, the portion of the frame member bottom horizontal segment 222 below the chemical filter element 216 is made foraminous, as shown, to allow oil to flow freely therethrough. The vertical inner wall 224 of the frame member 217 is also necessarily foraminous to allow oil flow therethrough.

Figure 5:
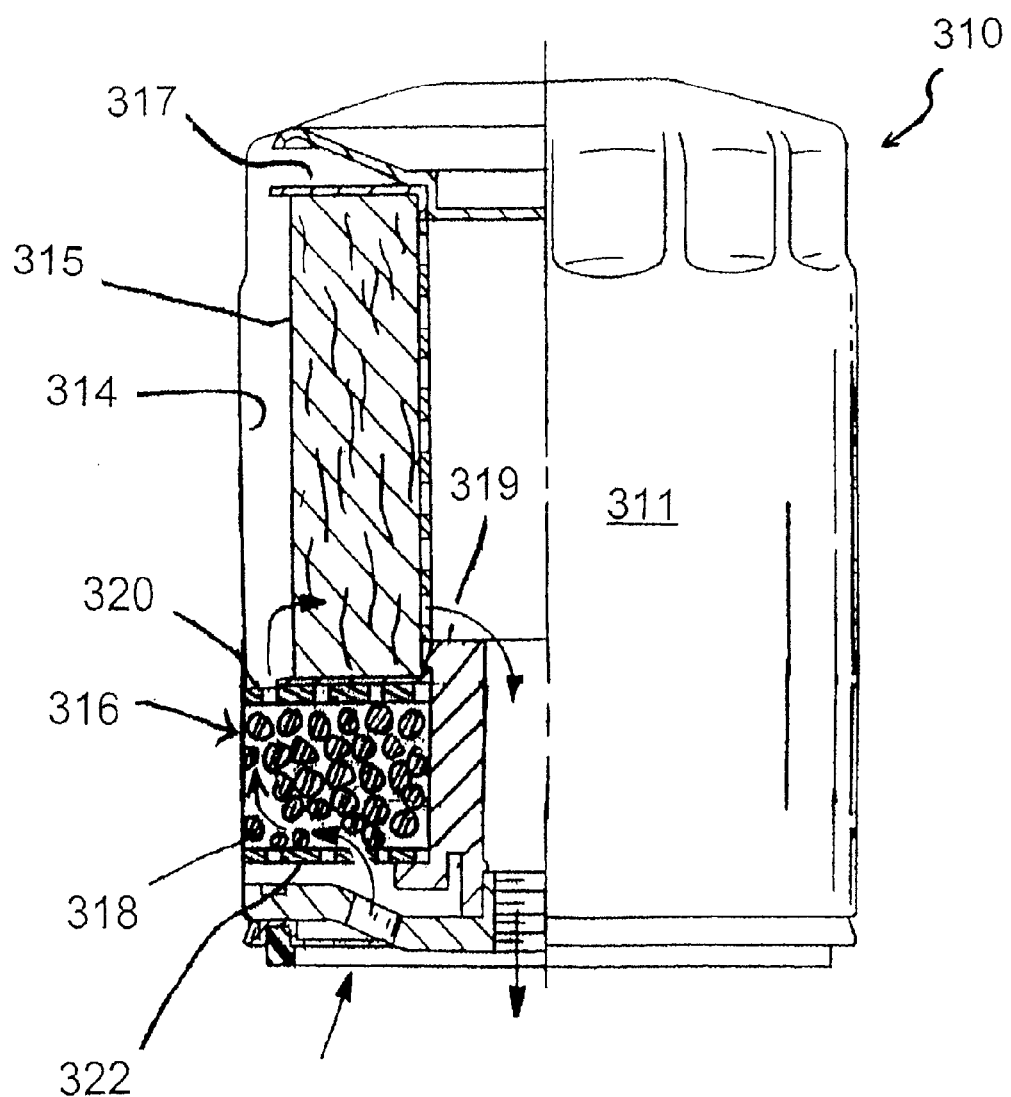
FIG. 5 is a cross-sectional view of an oil filter according to a third embodiment of the present invention.

Referring now to FIG. 5, an oil filter 310 in accordance with a third embodiment of the present invention is shown. With the exception of the configuration and placement of the respective mechanical and chemical filter elements 315, 316 and related components, and unless otherwise specified in this section, the oil filter 310 is substantially,identical to the oil filter 10 of the first embodiment, as described hereinabove.

The oil filter 310 in this embodiment generally includes a hollow cylindrical housing 311 which defines a chamber 314 therein, a porous mechanically active filter element 315 within that chamber, and a chemically active filter element 316, made up of a plurality of individual composite additive-dispensing modules 318, also retained within the chamber inside the housing and disposed below and before the mechanically active filter element. The additive-dispensing modules 318 are substantially identical to the additive-dispensing modules 18, as described in connection with the first embodiment 10.

Once again, the flow path through the filter is shown by the arrows in the drawing.

As noted in connection with the first embodiment 10, the individual additive-dispensing modules 318 making up the chemically active filter element 316 may be bonded together or otherwise cohesively associated with one another to form a substantially integral, yet highly porous filter element 316 capable of independently supporting itself.

In the embodiment 310 of FIG. 5, the mechanically active filter element 315 is a conventional cylindrical member made of accordion-pleated filter paper. A selectively foraminous cylindrical screen or support frame 317 may, optionally, be provided within the housing 311 to supportively hold the mechanically active filter element 315 therein. Also in this embodiment, porous annular upper and lower foraminous dividers 320, 322, respectively, may be placed above and/or below the chemically active filter element 316 to retain the additive-dispensing modules 318 of the chemically active filter element therebetween. The dividers 320 and/or 322, where used, may be selectively foraminous solid plates or may be mesh screens. The upper divider 320 is constructed and arranged to pass oil only to the outside surface of the mechanically active filter element 315, so that the oil must be mechanically filtered before exiting the filter 310.

The chemically active filter element 316 is also provided in the shape of a flattened cylinder in this embodiment, and is disposed below the mechanically active filter element 315. In this embodiment 310 the chemically active filter element 316 is located below the mechanical filter element 315, and therefore precedes the mechanical filter element in the flow path, in order to allow chemical modification of acids or other unwanted contaminants which may be present in the oil, with the beneficial additive composition of the chemically active filter element 316, prior to mechanical filtration. A central sealing member 319 is also provided and is similar to the grommet 19 as previously described in connection with the first embodiment.

This design ensures that the oil will pass completely through the chemically active filter element before it reaches the mechanically active filter element, and provides more and longer-lasting interaction between the oil and the chemically active filter element than the design of FIG. 4.

Figure 6:
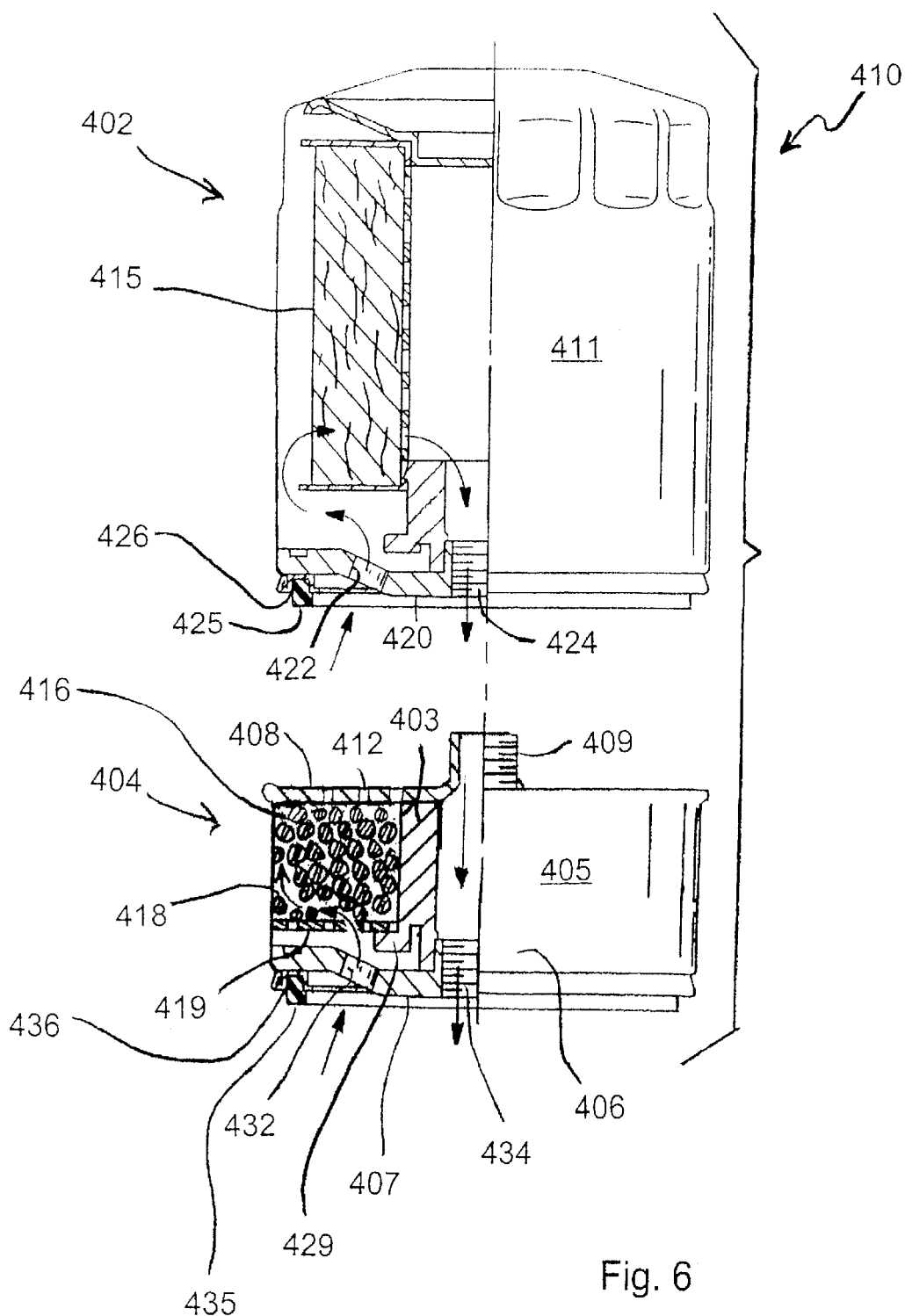
FIG. 6 is an exploded cross-sectional view of a two-part oil filter assembly according to a fourth embodiment of the present invention.

Referring now to FIG. 6, an oil filter assembly 410 in accordance with a fourth embodiment of the present invention is shown. The oil filter assembly 410 in this embodiment includes two primary parts, a conventional oil filter 402 shown on top in the drawing, and a supplemental cartridge 404, shown below the conventional filter.

The conventional oil filter 402 incorporates a mechanically active filter element 415 within a cylindrical housing 411. The conventional oil filter 402 further includes a base plate 420, which includes a plurality of inlet ports 422 arranged in a circular pattern as well as a central outlet port 424. The base plate 420 is provided as an integral part of the cylindrical housing 411, and an annular sealing member 425 fits engagingly into a groove 426 formed at the bottom surface of the base plate. The outlet port 424 has a plurality of female threads formed therein to allow rotatable mounting of the filter 402 on an externally threaded hollow tubular male connector fitting 409 of the supplemental cartridge 404.

The supplemental cartridge 404 is made to rotatably and threadably attach to an externally threaded hollow tubular fitting on an engine block (not shown), and to then have the conventional filter 402 rotatably and threadably fit thereon. The supplemental cartridge 404 includes a cylindrical housing 405 having a side wall 406, a base plate 407, sealably connected to the bottom edge of the side wall, and a cover plate 408 sealably connected to the top edge of the side wall.

The cover plate 408 has a plurality of outlet openings 412 formed therein above the chemically active filter member 416 to allow oil to flow outwardly from the supplemental cartridge 404 and then into the inlets 422 of the conventional oil filter 402.

The base plate 407 of the supplemental cartridge 404 includes a plurality of inlet ports 432, arranged in a circular pattern, as well as a central outlet port 434. The base plate 407 is provided as an integral part of the cylindrical housing 405, and an annular sealing member 435 fits engagingly into a groove 436 formed at the bottom surface of the base plate. The outlet port 434 has a plurality of female threads formed therein to allow rotatable mounting of the supplemental cartridge 404 to an externally threaded hollow tubular fitting on an engine block (not shown)

The hollow tubular male connector fitting 409, which is externally threaded, is provided at the center of the cover plate 408, and a cylindrical dividing wall member 403 is centrally disposed within the cartridge housing 405, and forms a fluid seal at the top and bottom surfaces thereof. The cylindrical dividing wall member 403 is preferably made of an oil-tolerant elastomer.

The supplemental cartridge 404 contains a chemically active filter element 416 therein. The chemically active filter element 416 is made up of a plurality of individual composite additive-dispensing modules 418, retained within the hollow space inside the cartridge housing 405 and disposed radially outside of the cylindrical dividing wall member 403. The additive-dispensing modules 418 are substantially identical to the additive-dispensing modules 18, as described in connection with the first embodiment 10.

As noted in connection with the first embodiment 10, the individual additive-dispensing modules 418 making up the chemically active filter element 416 may be bonded together or otherwise cohesively associated with one another to form a substantially integral, yet highly porous filter element capable of independently supporting itself.

Also in this embodiment, a porous, annular lower mesh screen 419 may be placed below the chemically active filter element 416 to retain the additive-dispensing modules 418 of the chemically active filter element thereabove. Where used, the mesh screen 419 may rest on a transverse horizontal flange 429, which is an integral part of the cylindrical dividing wall member 403.

When the conventional oil filter 402 is attached to the supplemental cartridge 404, the total assembly 410 functions in a manner similar to the oil filter 310 of FIG. 5.

The chemically active filter element 416 is also provided in the shape of a cylinder in this embodiment, and when the entire assembly 410 is considered as a whole, the chemically active filter element is disposed below the mechanically active filter element 415 of the conventional oil filter 402, and therefore precedes the mechanical filter element in the flow path, in order to allow chemical modification of acids or other unwanted contaminants which may be present in the oil, with the beneficial additive composition of the chemically active filter element 416, prior to mechanical filtration. This design ensures that the oil will pass completely through the chemically active filter element 416 before it reaches the mechanically active filter element 415, and provides more and longer-lasting interaction between the oil and the chemically active filter element than the design of FIG. 4.

Optionally, as shown in FIG. 7, the supplemental cartridge 404 may include a pair of hollow tubes 437, 438 attached to the side wall 406 thereof, which communicate with the interior of the cartridge housing 405. Where used, these tubes 437, 438 are provided to allow connection of the supplemental cartridge to a heat exchanger 440 to allow cooling of the oil which passes therethrough.

Although the present invention has been described herein with respect to a number of preferred embodiments thereof, the foregoing description is intended to be illustrative, and not restrictive. Those skilled in the art will realize that many modifications of the preferred embodiments could be made which would be operable. All such modifications, which are within the scope of the claims, are intended to be within the scope and spirit of the present invention.

Having, thus, described the invention, what is claimed is:

1. An oil filter, comprising:
   a hollow filter housing having an inlet and an outlet and defining a chamber therein with a flow path between the inlet and outlet;
   a mechanically active filter member disposed inside the filter housing in the flow path; and
   a chemically active filter member disposed inside the filter housing in the flow path;
      wherein the chemically active filter member comprises a plurality of additive-dispensing modules,
      each of said additive-dispensing modules comprising:
         a module housing which is a hollow shell having a plurality of holes formed therein; and
         an oil additive composition disposed within said module housing.

2. The oil filter of claim 1, wherein the additive composition comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

3. The oil filter of claim 2, wherein the additive composition comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

4. The oil filter of claim 1, wherein each of said additive-dispensing modules further comprises a porous or semi-porous membrane covering at least part of said module housing.

5. The oil filter of claim 4, wherein the membrane comprises a material selected from the group consisting of polysulfones, waxes, and polymethylene pentene.

6. The oil filter of claim 1, wherein said module housing comprises a ceramic material.

7. An oil filter, comprising:
   a hollow filter housing having an inlet and an outlet and defining a chamber therein with a flow path between the inlet and outlet;
   a mechanically active filter member disposed inside the housing in the flow path; and
   a chemically active filter member disposed inside the housing in the flow path;
      wherein the chemically active filter member comprises a plurality of additive-dispensing modules,
      each of said additive-dispensing modules comprising:
         a module housing which is a hollow shell having a plurality of holes formed therein;
         an oil additive composition disposed within the housing; and
         a porous or semi-porous polymeric membrane covering at least part of the housing.

8. The oil filter of claim 7, wherein the additive composition comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

9. The oil filter of claim 7, wherein said module housing comprises a ceramic material.

10. The oil filter of claim 7, wherein the membrane comprises a material selected from the group consisting of polysulfones, waxes, and polymethylene pentene.

11. A supplemental cartridge for use in conjunction with an oil filter, said supplemental cartridge comprising:
   a hollow cartridge housing, comprising
      a base plate for placement proximate an engine surface, said base plate having an outlet aperture formed substantially centrally therethrough and an inlet aperture formed therethrough and spaced apart from said outlet aperture;
      a cap opposite said base plate for placement proximate an oil filter, said cap having an inlet aperture formed substantially centrally therethrough and an outlet aperture formed therethrough and spaced apart from said inlet aperture;
      an outer wall connecting said cap and said base plate;
   a dividing wall member disposed within said housing and separating said housing interior into an inlet flow channel in fluid communication with said inlet aperture of said base plate, and an outlet flow channel in fluid communication with said outlet aperture of said base plate; and
   a chemically active filter member disposed within said inlet flow channel of said housing, said chemically active filter member comprising a plurality of additive-dispensing modules,
      each of said additive-dispensing modules comprising:
         a module housing which is a hollow shell having a plurality of holes formed therein;
         an oil additive composition disposed within the module housing; and
         a porous or semi-porous polymeric membrane covering the module housing.

12. The cartridge of claim 11, wherein the additive composition comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

13. The cartridge of claim 12, wherein the additive composition comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

14. The cartridge of claim 11, wherein the membrane comprises a material selected from the group consisting of polysulfones, waxes, and polymethylene pentene.

* * * * *